April 10, 1934.　　　　J. W. HUGHES　　　　1,954,206
OVERRUNNING CLUTCH
Filed Oct. 12, 1931　　　4 Sheets-Sheet 1

INVENTOR.
JAMES W. HUGHES.
BY
ATTORNEYS.

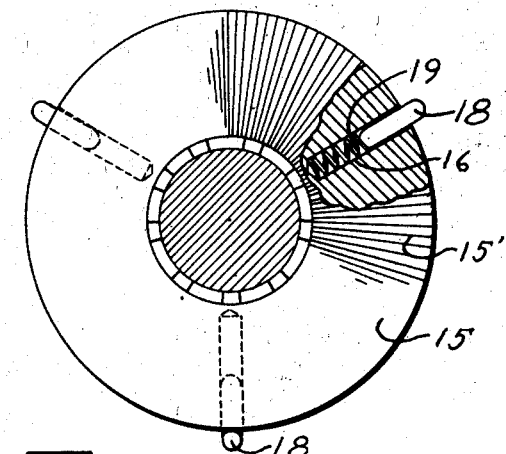
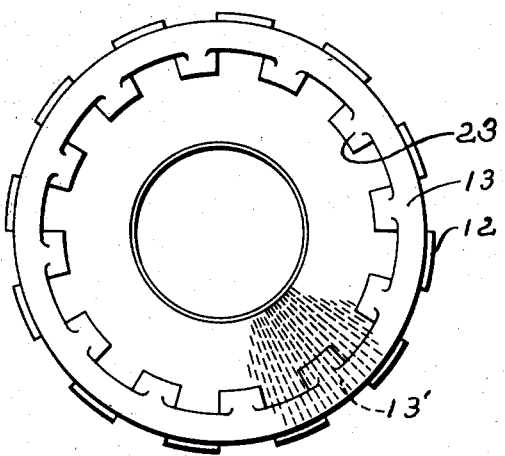
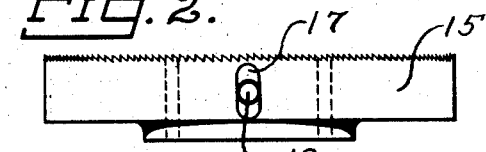
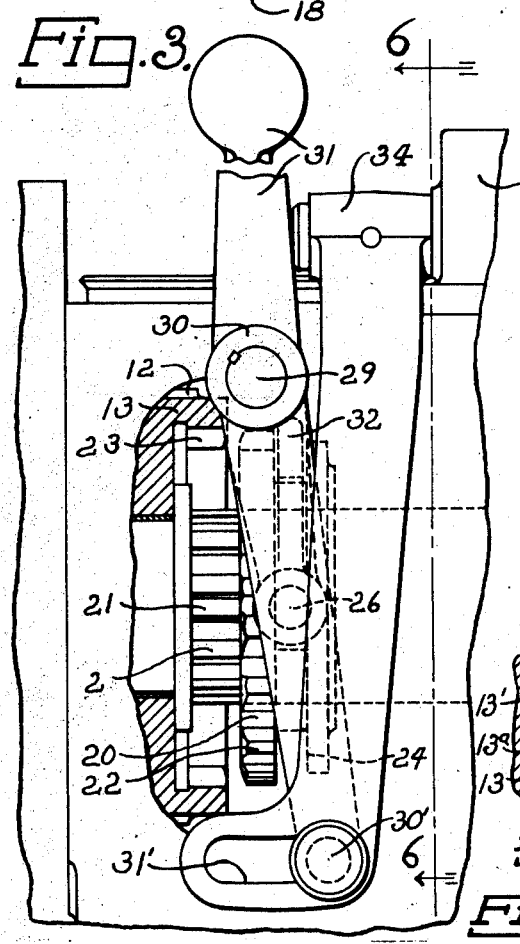
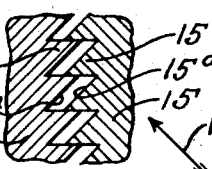

April 10, 1934.  J. W. HUGHES  1,954,206
OVERRUNNING CLUTCH
Filed Oct. 12, 1931  4 Sheets-Sheet 3

INVENTOR.
JAMES W. HUGHES.
BY
ATTORNEYS.

April 10, 1934.   J. W. HUGHES   1,954,206
OVERRUNNING CLUTCH
Filed Oct. 12, 1931   4 Sheets-Sheet 4

INVENTOR.
JAMES W. HUGHES.
BY
ATTORNEYS.

Patented Apr. 10, 1934

1,954,206

UNITED STATES PATENT OFFICE 1,954,206

OVERRUNNING CLUTCH

James W. Hughes, Detroit, Mich., assignor to Chrysler Corporation, Detroit, Mich., a corporation of Delaware Application October 12, 1931, Serial No. 568,401

11 Claims. (Cl. 192—46)

This invention relates to an improved overrunning clutch mechanism, particularly for vehicle transmissions.

The main objects of the invention are to provide improved driving and driven over-running clutch elements which have cooperating teeth on their adjacent side faces; to provide teeth on clutch elements of this kind which have inclined surfaces for thrusting the clutch elements apart during initial rotation of one element relative to the other in a predetermined direction; to provide opposed sides on the teeth which bite when the clutch element is rotated in the opposite direction so as to form a positive one-way driving connection; to provide improved means for moving the clutch elements together; to provide means of this character which thrust one clutch element in a direction inclined oppositely with respect to the inclined sides of the teeth of the clutch elements so as to relieve the pressure between the sides of the teeth which bite during meshing thereof; to provide apparatus of this kind which brings the teeth into fully meshed relation before an appreciable driving load is applied on the clutch elements; and to provide means for holding the clutch elements in disengaged relation during continuation of the relative rotation thereof in the first mentioned direction so as to prevent dragging of the inclined sides of the teeth upon each other.

Illustrative embodiments of the invention are shown in the accompanying drawings, in which:

Fig. 2 is a vertical section taken on the line 2—2 of Fig. 1, showing a side face and the teeth thereon of the driving clutch element of the free wheeling unit.

Fig. 3 is a plan view of the clutch unit illustrated in Fig. 2.

Fig. 4 is a vertical section taken on the line 4—4 of Fig. 1.

Fig. 5 is a fragmentary side elevation of the transmission, illustrating control apparatus for the over-running clutch and reverse gear of the transmission.

Fig. 6 is a vertical section taken on the line 6—6 of Fig. 5.

Fig. 7 is an enlarged fragmentary section illustrating diagrammatically the direction of the thrust applied on the shiftable clutch element during movement thereof into engagement with its companion clutch element.

Figure 1:
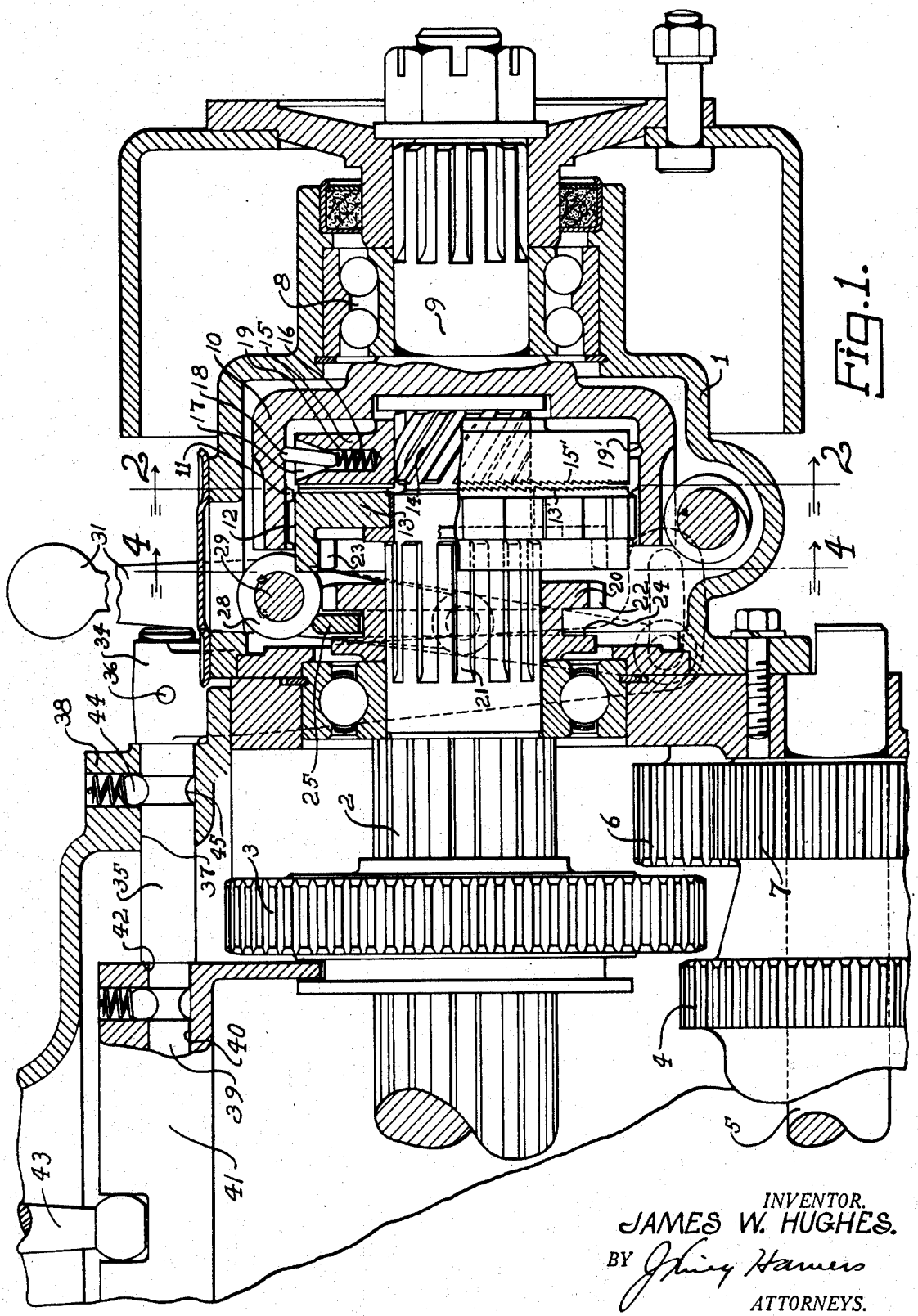
Fig. 1 is a longitudinal vertical section of a vehicle transmission which is equipped with a free wheeling unit that embodies my invention.
Figures 8, 9:
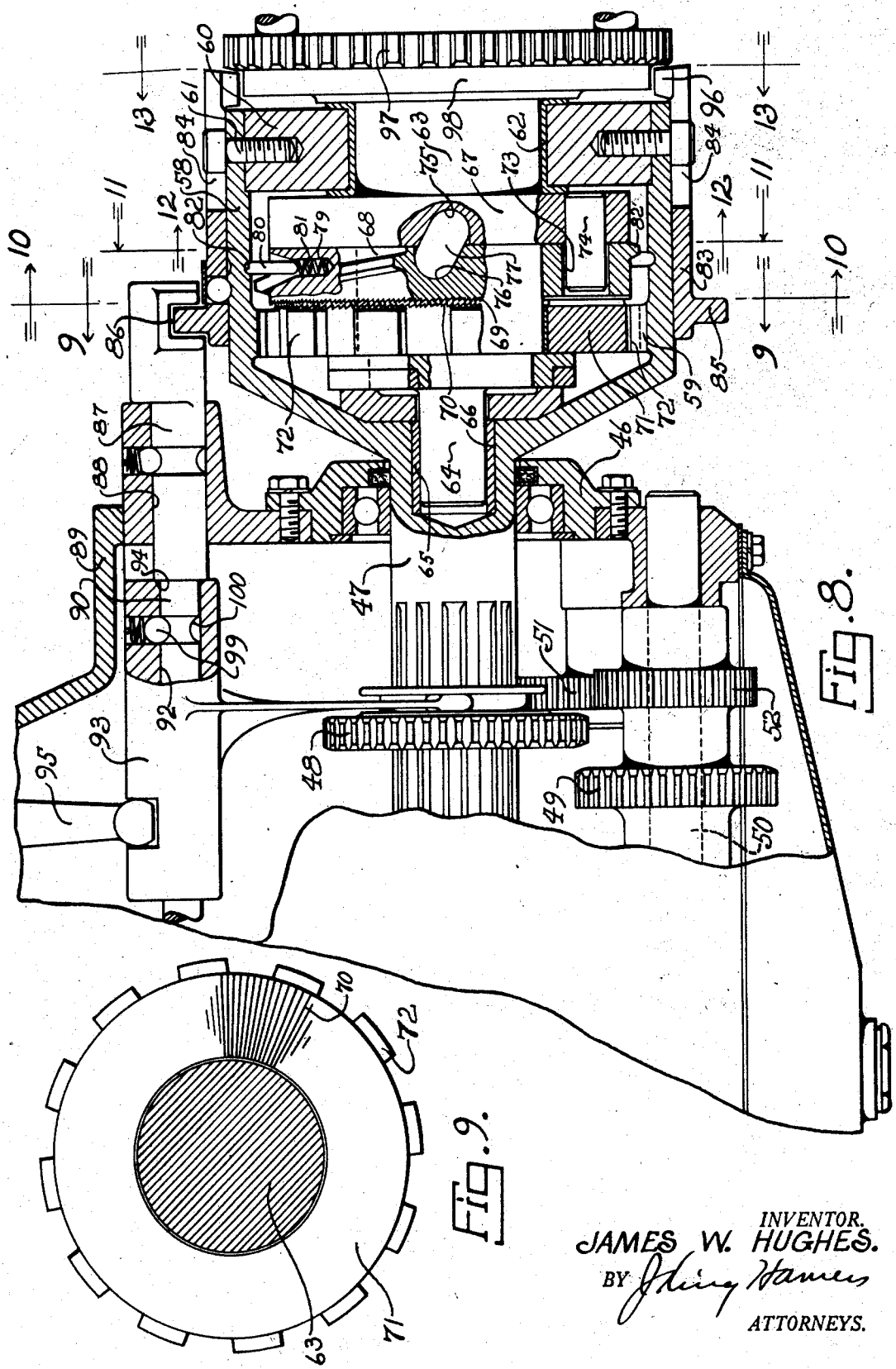
Fig. 8 is a longitudinal vertical section of a vehicle transmission which is equipped with an over-running clutch, or free wheeling unit that embodies a modified form of the invention.
Fig. 9 is a transverse vertical section taken on the line 9—9 of Fig. 8, showing the toothed side face of the driving clutch element.
Figure 10:
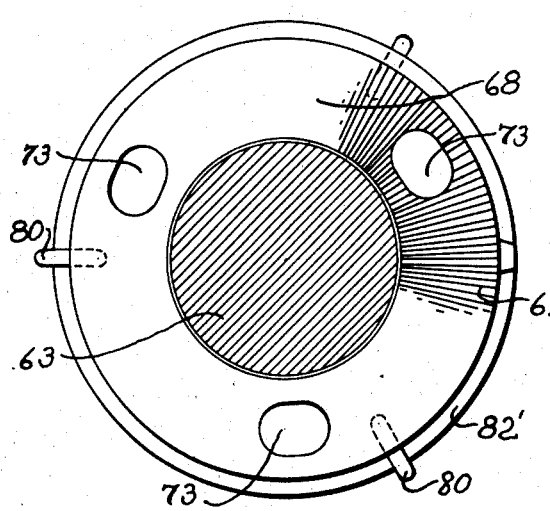
Fig. 10 is a vertical section taken on the line 10—10 of Fig. 8, showing the toothed side face of the driven clutch element.
Figure 11:
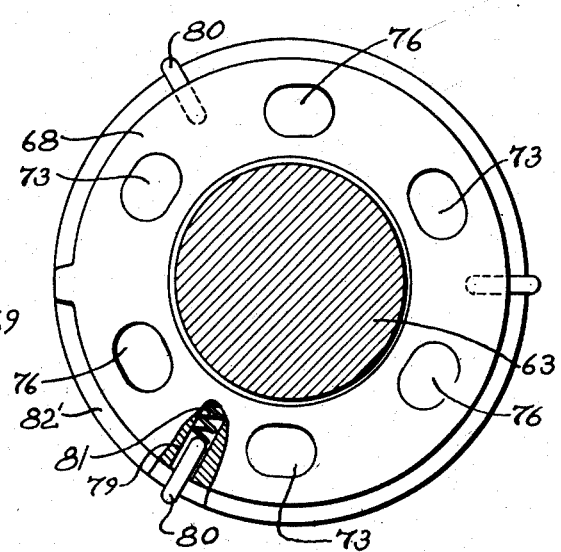
Fig. 11 is a transverse vertical section taken on the line 11—11 of Fig. 8 showing the offset face of the driven clutch element.
Figure 13:
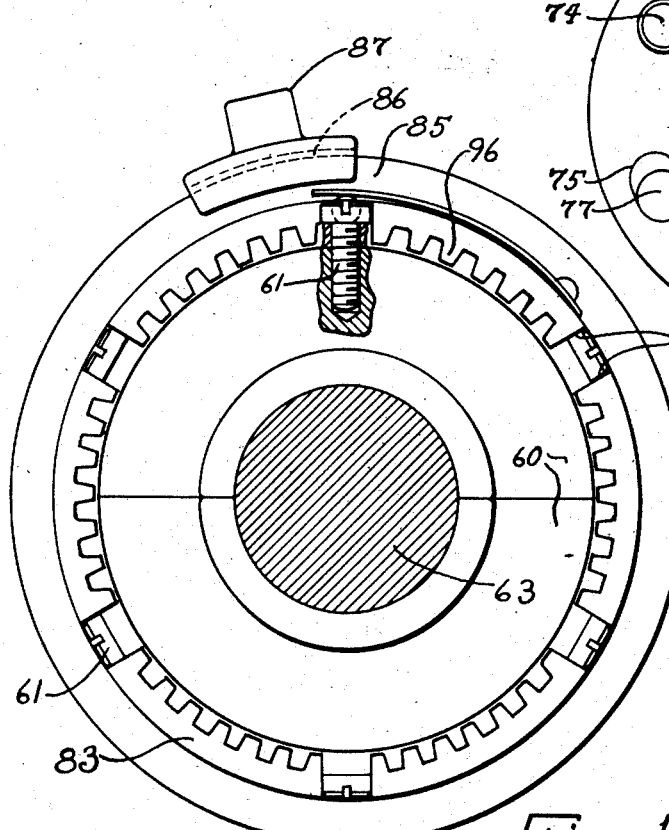
Fig. 13 is a transverse section taken on the line 13—13 of Fig. 8.
Figure 12:
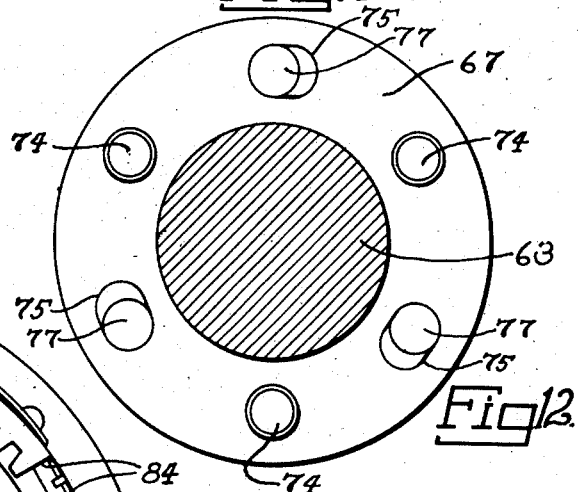
Fig. 12 is a transverse section taken on the line 12—12 of Fig. 8.
Figure 14:
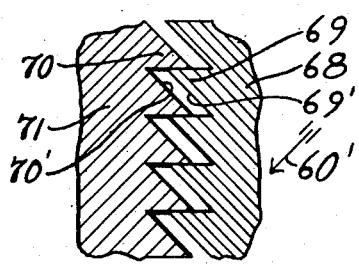
Fig. 14 is an enlarged fragmentary section illustrating diagrammatically the direction in which thrust is applied upon the clutch elements and their teeth when the clutch elements are engaged together.

In the form shown in Figs. 1 to 7, inclusive, my improved over-running clutch or free wheeling unit is illustrated in conjunction with the transmission of the type used in vehicles which includes a casing 1 having a shaft 2 therein on which a gear 3 is splined. The gear 3 is adapted to mesh with a low speed pinion 4 on a countershaft 5 of the transmission and also to mesh with a reverse pinion 6 that is driven by a pinion 7 of the countershaft. Journaled in bearings 8 which are mounted in the rear end of the casing 1, is a driven shaft 9 having an enlarged hollow cylindrical drum portion 10 on its inner extremity.

Formed on the inner periphery of the drum 10 are teeth 11 which mesh with teeth 12 on the outer periphery of a driven clutch element 13 that is journaled on the shaft 2 of the transmission. The shaft 2 has spiral teeth, or partial threads 14 adjacent the journaled clutch element on which a shiftable clutch element is threaded. These partial threads are so formed as to move the clutch element 15 to the left as viewed in Fig. 1, toward the driven clutch element 13 when the shaft 2 rotates in a clockwise direction relative to the clutch element 15, as viewed from the left.

The shiftable clutch element 15 is provided with radially extended apertures 16 having flared outer extremities 17, elongated in the direction of the axis of the shiftable clutch element, in which pins 18 are disposed. The lower ends of the pins 18 are seated upon coil springs 19 which are confined in the apertures 16 and the outer extremities of the pins are received in an annular groove 19' formed in the inner periphery of the drum 10. These pins retard the rotation of the shiftable clutch element when the shaft 2 rotates at a faster rate than the driven shaft 9 so as to move the shiftable clutch element 15 toward the other clutch element 13. The end portions of the apertures 16 permit the pins to tilt freely during movement of the shiftable clutch element. This construction prevents frictional resistance to axial movement of the shiftable clutch element.

Formed on the adjacent sides of the clutch elements 13 and 15, are clutch teeth 13' and 15', each having opposed sides which interengage to form a positive driving connection between the clutch elements when one thereof is rotated in one direction relative to the other. The teeth 13' and 15' also have inclined sides 13ᵃ and 15ᵃ respectively, which cam the clutch elements apart when one element rotates relative to the other in an opposite direction. The threads 14 of the shaft 2 are inclined oppositely with respect to the inclined faces 13ᵃ and 15ᵃ so as to thrust the shiftable clutch element 15 in a direction which relieves the pressure between the interengaging faces of the teeth 13' and 15' as the latter are meshed together.

In operation, when the clutch elements of the free wheeling units are spaced apart, as illustrated in Fig. 1, the driven shaft 9 is free to rotate in a clockwise direction, relative to and at a greater speed than the shaft 2 of the transmission. This permits free coasting of the vehicle in a forward movement of the vehicle by the engine and transmission gearing. As the speed of rotation of the transmission shaft 2 is increased by augmenting the speed of the motor, until the speed of rotation of the driven shaft 9 is exceeded slightly, the transmission shaft 2 turns through a limited angle relative to the shiftable clutch element 15 which is held back by the frictional engagement of the pins 18 with the hollow drum portion of the driven shaft 9 and shiftable clutch element 15, the threads 14 of the transmission shaft move the shiftable element leftwardly toward the clutch element 13 so as to bring the teeth of the clutch elements together. The thrust upon the shiftable clutch element is directed by the threads 14 of the shaft 2 as indicated diagrammatically by the arrow 16' in Fig. 7 so as to relieve the pressure upon the opposed faces of the teeth during their engagement and to avoid deformation of the tips of the teeth when the latter are initially engaged together throughout only a limited portion of their depths. The transmission shaft 2 is allowed to rotate relative to the shiftable clutch element 15 until the teeth are fully meshed and for this reason, only slight load is placed upon the teeth of the clutch elements before their opposed sides are engaged throughout the entire depth of the teeth. When the teeth are fully engaged, leftward movement of the shiftable clutch element is arrested by engagement thereof with the clutch element 13, and a positive one-way driving connection between the two clutch elements and their respective driving and driven parts is established.

When the driven shaft 9 is rotated by the road wheels of a vehicle at a faster speed than the transmission shaft 2 is driven by the engine, the frictional engagement between the pins 18 and the drum 10 causes the shiftable clutch element 15 to be rotated in a clockwise direction relative to the transmission shaft. During this relative rotation of the shiftable clutch element and transmission shaft, the threads 14 of the latter move the shiftable clutch element to the right, as viewed in Fig. 1 so as to disengage the clutch elements and permit over-running of the driven shaft 9 with respect to the transmission shaft 2. The inclined faces 13ᵃ and 15ᵃ aid in effecting a prompt separation of the clutch elements upon the occurrence of such relative rotation. Rightward movement of the shiftable clutch element 15 is arrested by the inner wall of the drum 10 after the teeth of the clutch elements are fully disconnected. The pins 18 slip in the groove 19' after rightward movement of the shiftable clutch element 15 terminates while the drum continues to rotate relative to the shiftable clutch element thereby holding the latter against leftward movement. When the transmission shaft 2 again exceeds the speed of the driven shaft 9, the shiftable clutch element 15 is moved by the screw threads 14 into engagement with the fixed clutch element 13 in the above manner.

Apparatus is provided for establishing a two-way driving connection between the transmission shaft 2 and the driven shaft 9 selectively at the will of the operator and automatically when the gear 3 is meshed with the reverse pinion 6. This apparatus includes a jaw clutch element 20 which is splined at 21 on the transmission shaft 2 and which has external teeth 22 that are engageable with internal teeth 23 formed on the fixed clutch element 13. The jaw clutch element 20 is provided with a groove 24 in which a yoke 25 is seated. This yoke has a pin 26 extending laterally from one of its extremities on which the lower end of a lever 27 is journaled. Formed on the upper end of the lever 27 is a collar 28 which is fixed on a shaft 29 that extends transversely of the transmission housing and through one side thereof.

Rigidly mounted on the external end of the shaft 29 is a lever 30 having an upwardly extending manually operable arm 31 which is located in close proximity to the driver's seat of the vehicle. The lever 30 has a downwardly extending arm 32 which is pivotally attached to the lower end of an angular-shaped bar 33 by a pin 30' which extends through an elongated slot 31' formed in the lower end of the bar 33. This bar has a horizontal portion extending over the top of the transmission casing on the extremity of which is formed a collar 34 for receiving a stem 35. The collar 34 is fixed to the stem 35 by a pin 36. The stem 35 is slidably mounted in an aperture 37 in the dome 38 of the transmission casing and it has a pilot pin 39 on its inner extremity which is received in a passage 40 formed in the gear shift bar 41 that controls the transmission gear 3.

The rear extremity of the gear shift bar 41 abuts a shoulder 42 on the stem 35 when the gear shift bar is moved rightwardly by the gear shift lever 43 in establishing a reverse drive setting of the gears, so as to shift the stem 35 rightwardly, as viewed in Fig. 1. This movement of the stem 35 and the angular arm 33 rotates the lever 30, shaft 29, and internal lever 27 in a counter-clockwise direction so as to shift the jaw clutch element 20 to the right, as viewed in Fig. 1, thereby engaging the teeth 22 thereof with the teeth 23 of the fixed clutch element and establishing a positive two-way driving connection between the transmission shaft 2 and the driven shaft 9.

The two-way driving connection may be produced at the will of the driver by rotating the operating arm 31 of the lever 30 in a counter-clockwise direction, as viewed in Fig. 1 so as to directly turn the shaft 29 and lever 27 in a counter-clockwise direction for engaging together the jaw clutch element and the fixed clutch element 13 of the free wheeling unit. The pin 30' slides in the groove 31' in the lower end of the bar 33, and the bar 33 is held at rest by engagement of the ball detent 44 in the groove 45 of the stem 35, when the jaw clutch element is manipulated by the operating arm 31 of the lever 30.

The form of my improved over-running clutch or free wheeling unit shown in Figs. 8 to 14 inclusive, is illustrated in conjunction with a transmission of the type shown in Figs. 1 to 7 and described above, which includes a casing 46 having a shaft 47 on which a gear 48 is splined. The gear 48 is adapted to mesh with a low speed pinion 49 on a countershaft 50 of the transmission, and it is also adapted to mesh with a reverse pinion 51 that is driven by a pinion 52 on the countershaft 50. Formed on the outer end of the transmission shaft 47 is a hollow cylindrical drum 58 having internal clutch teeth 59 at its inner extremity. The drum 58 has an inwardly extending ring 60 fixed by cap screws 61 on its outer extremity which is provided with a bushing 62 in which a driven shaft 63 is journaled. The driven shaft 63 has an integral pilot pin 64 on its inner extremity which is journaled in a bushing 65 seated in an aperture 66 formed in the end of the transmission shaft 47. The driven shaft 63 is also provided with a radial flange 67 adjacent which is journaled a shiftable clutch element 68. The shiftable clutch element 68 is provided on its left face, as viewed in Fig. 8, with teeth 69 which are adapted to mesh with teeth 70 on the adjacent side face of a fixed clutch element 71. The teeth 69 and 70 have opposed faces which interengage to form a positive driving connection between the clutch elements when one clutch element rotates in one direction relative to the other, and inclined sides 69' and 70', respectively, which cam the clutch elements apart when one thereof rotates relative to the other in an opposite direction. The clutch element 71 is concentrically mounted in the drum 58 and is provided with external teeth 72 which are permanently meshed with the teeth 59 of the drum.

Formed in the shiftable clutch element 68 are elongated holes 73 into which extend dowel pins 74 that are carried by the flange 67 of the driven member. The dowel pin 74 limits rotation of the shiftable clutch element 68 relative to the driven member. The radial flange 67 and the shiftable clutch element 68 have end recesses 75 and 76 in their adjacent sides, in which capsule-shaped cam members 77 are confined. The recesses 75 and 76 have sufficient depths to accommodate the cam members 77 when the recesses are in the staggered relation shown in Fig. 8. When the shiftable clutch element 68 is rotated relative to the flange 67 in a direction which brings the recesses into registration, the members 77 bear between the extremities of the recesses and move the shiftable clutch element to the left, as viewed in Fig. 8. The thrust exerted on the shiftable clutch element by the members 77 is directed, as illustrated by the arrow 60' in Fig. 14, at an inclination opposite to that of the inclined faces of the teeth 69 and 70 in such a manner as to prevent the application of pressure on the opposed sides of the teeth by the thrust delivered by the pins. This relief of the pressure obviates breaking or other deformation of the tips of the teeth when only the latter are in contact during initial engagement of the clutch elements.

The shiftable clutch element 68 has radial apertures 79 in its outer periphery in which are seated pins 80 that are urged outwardly by coil springs 81 confined in the lower extremity of the apertures. The outer ends of the pins 80 are received in a groove 82 formed in the inner periphery of the drum 58. The outer extremities of the apertures 79 are elongated and flared in the direction of movement of the shiftable clutch element so as to permit tilting of the pins during axial movement of the latter clutch element with respect to the drum without frictional opposition by the pins.

When the driven member 63 is rotated by the road wheels of the vehicle at a greater speed than the speed of rotation of the transmission shaft 47 and drum 58, the pins 80 retard rotation of the shiftable clutch element 68 relative to the drum until the pins 74 reach the ends of the elongated holes 73. This rotation of the shiftable clutch element 68 relative to the flange 67 of the driven member places the wedge member 77 in the inclined position shown in Fig. 8, and permits the shiftable clutch element to be urged to the right by the engagement of the inclined sides of the teeth 69 and 70 of the clutch elements. The shiftable clutch element is urged further to the right by the pressure of lubricant, such as the grease in the drum, upon a spiral thread 82 formed on the outer periphery of the shiftable clutch element. This pressure results from the rotation of the shiftable clutch element relative to the drum and comparatively thick lubricant which it carries.

When the rotation of the transmission shaft 47 is increased slightly beyond the speed of rotation of the driven member, the pins 80 rotate the shiftable clutch element in a clockwise direction relative to the flange 67 of the driven member causing the cam members 77 to be turned toward a parallel relationship with respect to the axis of the transmission shaft. This movement of the cam members urges the shiftable clutch element 68 to the left so as to bring the teeth thereof into meshed engagement with the teeth of the fixed clutch element 71. The extremities of the elongated apertures 73, however, do not engage the pins 74 until the teeth are fully meshed and therefore substantially no appreciable driving load is placed upon the teeth before the full extent of their opposed faces are brought into contact with each other.

The free wheeling unit is provided with apparatus by which a two-way positive driving connection is established automatically when the transmission is set to effect reverse driving. This apparatus includes a sleeve 83 which is slidably mounted on the outer periphery of the drum and held against relative rotation by the heads of the bolts 61 which extend into slots 84 in the sleeve. This sleeve has a radial flange 85 on its rear end which is received in a notch 86 of a stem 87 that is slidably mounted in an aperture 88 in the dome 89 of the transmission housing. Formed on the inner end of the stem 87 is a pilot pin 90 which is received in the passage 92 in the gear shift bar 93 which controls the gear 48. The stem 87 also has a shoulder 94 which abuts the extremity of the gear shift bar 93 when the latter is moved to the right, as viewed in Fig. 8, for bringing the gear 48 into mesh with the reverse pinion 51.

With this construction, when the gear shift bar 93 is moved rearwardly by the gear shift lever 95 to arrange the gears for reverse driving, the stem 87 and the sleeve 83 with which it coacts are moved rearwardly so as to bring the teeth 96 on the rear end of the sleeve 83 into mesh with the external teeth 97 formed on an integral flange 98 of the driven member. The ball detent 99 which is carried by the gear shift bar 93 and received in a groove 100 in the pilot pin 90 holds the gear shift bar and pilot pin together so as to cause the stem to move forwardly when the gear shift bar 93 is moved forwardly in discontinuing the reverse driving relation of the gears of the transmission, and thereby rendering the free wheeling unit operative.

The sleeve 83 may be selectively moved to, and held in its rearward position so as to maintain a positive two-way drive relation between the shaft 47 and the driven member 63 at the will of the driver, by mechanism not shown, which coacts with the flange 85 of the sleeve 83 in the same manner as the notched end of the stem 87.

Although but several embodiments of this invention have herein been shown and described, it will be understood that various changes in the size, shape, and arrangement of parts may be made without departing from the spirit of my invention and it is not my intention to limit its scope other than by the terms of the appended claims.

What I claim is:

1. In combination, driving and driven members, a pair of clutch elements each associated with one of said members and one being rotatable and shiftable relative thereto, co-operating teeth on said clutch elements, means for limiting rotation of said shiftable clutch element relative to the member with which it is associated, and means including tiltable cam members between faces of said driven member and said shiftable clutch element for shifting the latter clutch element during rotation thereof, adapted to bring said teeth into substantially fully meshed relation before relative rotation of said clutch elements is arrested by said limiting means.

2. In combination, driving and driven members, a clutch element fixed with respect to one of said members, a shiftable clutch element journaled on the other member, co-operating teeth on said clutch elements having inclined surfaces for urging said clutch elements apart during initial rotation of one element relative to the other in one direction, and frictional means coacting between one of said members and said shiftable clutch element for holding the latter element against movement toward the other clutch element during continuation of such relative rotation, said frictional means including a tiltable pin adapted to maintain contact with the same portion of the member with which it coacts regardless of the relative positions of said clutch elements.

3. In combination, driving and driven members, a clutch element fixed with respect to one of said members, a shiftable clutch element rotatable with respect to the other member, teeth on adjacent side faces of said clutch elements, means including cam members seated in corresponding recesses of adjacent faces of said driven member and said shiftable clutch element respectively for moving the latter toward the other clutch element for engaging said teeth, and means for arresting rotation of said shiftable clutch element relative to the member with which it is associated after said teeth are substantially fully engaged together.

4. In combination, driving and driven members, an over running clutch for forming a one way driving connection between said members having a clutch element non-rotatably secured to said driven member, a second clutch element threaded on said driving member, teeth on said clutch elements having inclined surfaces for urging the latter apart during rotation of said second clutch element in one direction relative to the other clutch element, and means mounted on said second clutch element including a yieldable member having a friction shoe element thereon frictionally engaging said driven member for screwing said second clutch element away from the other clutch element during such relative rotation, said friction shoe being tiltable relative to said second clutch element and adapted to remain in contact with the same portion of said driven member regardless of the relative positions of said clutch elements.

5. In a transmission having driving and driven members, an over running clutch having one clutch element non-rotatably secured to one of said members and a shiftable clutch element threaded on the other member adapted to move toward the other clutch element during rotation of the latter member in one direction relative to said shiftable clutch element, teeth on adjacent sides of said clutch elements, said shiftable clutch element being rotatable relative to the member on which it is threaded until the teeth of said clutch elements are substantially fully meshed, and means including cam members interposed between said driven member and said shiftable clutch element for rotating the latter in the same direction relative to the member on which it is threaded when the other member exceeds the rotation of the shiftable clutch element carrying member so as to disengage said clutch elements.

6. In a transmission having driving and driven members, an over running clutch having a clutch element non-rotatably secured to one of said members and a shiftable clutch element rotatable with respect to the other member, teeth on adjacent sides of said clutch elements, tiltable means coacting between said shiftable clutch element and the structure of the latter member for moving said shiftable clutch element into engagement with the other clutch element during rotation of said shiftable clutch element in one direction relative to said structure, and means for preventing rotation of said shiftable clutch element with respect to the member with which it is associated after said teeth are substantially fully engaged so as to provide a direct driving connection between said members in one direction.

7. In a transmission having driving and driven members, an over running clutch having a clutch element non-rotatably secured to one of said members and a shiftable clutch element rotatable with respect to the other member, teeth on adjacent sides of said clutch elements, tiltable means coacting between said shiftable clutch element and the structure of the latter member for moving said shiftable clutch element during rotation of said shiftable clutch element in one direction relative to said structure, means for preventing rotation of said shiftable clutch element with respect to the member with which it is associated after said teeth are substantially fully engaged so as to provide a direct driving connection between said members in one direction, and a vein on said shiftable clutch element extending into the lubricant of said transmission for retarding rotation of said shiftable clutch element with respect to the rotation of the member with which it is associated.

8. In combination with driving and driven members, an over-running clutch having a clutch element non-rotatably mounted on one of said members, a shiftable clutch element on the other member rotatable through a limited arc relative thereto, teeth on said clutch elements having opposed faces adapted to form a positive one-way driving connection between said members, and means including tiltable cam members disposed between said driven member and shiftable clutch element responsive to rotation of the member with which said shiftable clutch element is associated relative to the shiftable clutch element in one direction for moving the latter toward the other clutch element, said means being so constructed and arranged as to urge the shiftable clutch member oppositely about its axis with respect to the direction of rotation required thereof to exert pressure on the opposed faces of the teeth of said elements during meshing of said teeth.

9. In combination with driving and driven members, an over-running clutch having a clutch element non-rotatably mounted on one of said members, a shiftable clutch element on the other member rotatable through a limited arc relative thereto, teeth on said clutch elements having opposed faces adapted to form a positive one-way driving connection between said members, and having opposite sides inclined with respect to said opposed faces, and tiltable spreading members between said driven member and said shiftable clutch element inclined in the same general direction as the inclined sides of said teeth when said clutch elements are separated and adapted to urge said shiftable clutch element toward the other clutch element during rotation of the latter member in one direction relative to the shiftable clutch element without forcing the opposed faces of the teeth of the clutch elements together during meshing thereof.

10. In combination, driving and driven members, a pair of clutch elements each associated with one of said members and one being rotatable throughout a limited distance and axially shiftable relative thereto, means for shifting the latter clutch element axially of the member with which it is associated during relative rotation of said member and its clutch element so as to engage and disengage said clutch elements, said shiftable clutch element having an opening in its periphery, and friction means for applying a drag on said shiftable clutch element including a spring in said opening and a pin extending thereinto and seated on said spring, the outer end portion of said pin having smaller dimensions than the external end of said opening and said pin being adapted to oscillate therein during axial movement of said shiftable clutch element.

11. In combination, driving and driven members, a pair of clutch elements each associated with one of said members and one being rotatable throughout a limited distance and axially shiftable relative thereto, means for shifting the latter clutch element axially of the member with which it is associated during relative rotation of said member and its clutch element so as to engage and disengage said clutch elements, and means for retarding rotation of said shiftable clutch element including an oscillatable pin adapted to remain in contact with the same portion of one of said members during axial movement of said shiftable clutch element.

JAMES W. HUGHES.